May 16, 1967 R. H. SEMENOFF 3,319,521
ELECTROMAGNETIC RADIATION PROOF BOMB-ARMING DEVICE
Filed Aug. 27, 1965
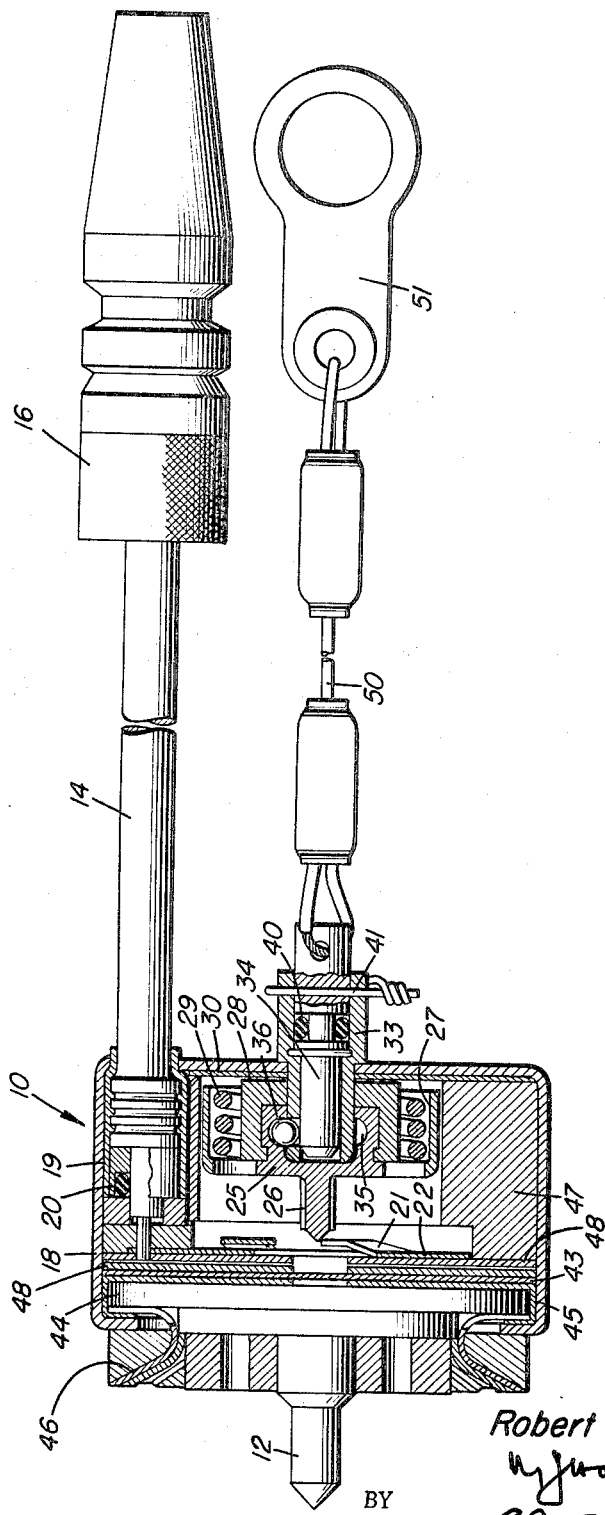
INVENTOR
Robert H. Semenoff
BY
ATTORNEY
AGENT

3,319,521
ELECTROMAGNETIC RADIATION PROOF BOMB-ARMING DEVICE
Robert H. Semenoff, Takoma Park, Md., assignor to the United States of America as represented by the Secretary of the Navy
Filed Aug. 27, 1965, Ser. No. 483,379
1 Claim. (Cl. 89—1.5)

ABSTRACT OF THE DISCLOSURE

An arming safety switch having one switch contact within a shielded bomb fuze assembly and the other switch contact externally positioned and separated therefrom by a radiation hazard total shield foil. The external switch contact being part of a spring loaded stabber member which is released when the bomb is dropped to penetrate the shield and close the switch.

---

The invention described herein may be manufactured and used by or for the Government of the United States of America for governmental purposes without the payment of any royalties thereon or therefor.

This invention generally relates to an arming safety switch for a bomb fuze and more particularly to an electromagnetic radiation proof bomb-arming device that is used for supplying electrical energy to a bomb fuze after the bomb is launched from an aircraft.

Electric fuze systems for bombs having therein electro-explosive components which are actuated by the closing of a switch either simultaneously with an arming operation or at some time interval after an arming operation have been known to be actuated by energy radiated by electronic equipment aboard the launching aircraft and nearby facilities, such as radar and radar transmission gear. It is the possibility of premature actuation of the electro-responsive components in this manner that makes necessary the provision of means for preventing undesirable electromagnetic radiation of all frequencies from entering the bomb fuze. The present invention is designed to satisfy that requirement.

For safety reasons, it has become the practice to delay the arming of a bomb until it starts its travel away from the aircraft that is carrying the bomb. Most present day bombs are electrically armed, and it is therefore necessary to have an electrical connection between the aircraft and the fuze in the bomb during part of the downward travel of the bomb. After the bomb has travelled a short distance, a switch is normally automatically closed and an electrical impulse is then received by the bomb fuze to arm the bomb.

Accordingly, in the bomb arming device of the present invention, an arming safety switch is provided having one switch contact positioned within the bomb-fuze charging plug assembly and the other switch contact externally positioned and separated therefrom by a radiation hazard total shield foil. The external switch contact is part of a spring-loaded stabber member which is mechanically released when the bomb is dropped so that it may penetrate the shield and close the switch. The fuze may then be charged through an electrical cable connecting the bomb and the aircraft and having associated therewith a unique connection to the arming safety switch. The electrical cable of this invention is an expandable item, and instead of remaining with the aircraft it is separable therefrom and is thus permitted to go down with the bomb after the bomb fuze has been charged.

While many heretofore available bomb arming devices, such as the one shown and described in U.S. Patent 3,158,-060, entitled "Wafer Switch Having Quick Release Connector," adequately arm bombs and successfully reduce induced electrical currents in electrical bomb fuzing due to the proximity of radio and radar antennae to a safe value in most cases, they are, nevertheless, not completely effective in all cases. The wafer switch of the above-mentioned patent, for example, will only keep out radiation in the lower frequencies.

It is therefore a general object of the present invention to provide an expendable, electromagnetic radiation proof bomb-arming device.

Another object of the present invention is to provide a bomb fuze with an arming safety switch having means for shielding the fuze from stray waves of electromagnetic energy of all frequencies which may actuate the fuze.

Still another object of the present invention is to provide an arming safety switch for a bomb fuze that is not effected by radiant energy.

Other objects and advantages of the present invention will be readily appreciated by those skilled in the art as the same becomes better understood by reference to the following detailed description when considered in connection with the accompanying drawing, wherein there is shown, for illustrative purposes only, a preferred form of the invention and in which the single figure discloses a longitudinal view, partly in section, of the preferred embodiment of the invention.

Referring now to the drawing, the reference numeral 10 generally indicates the arming safety switch of the present device, having a contact 12 at one end thereof positioned within the bomb fuze charging plug and a coaxial cable 14 at the other end connected to the launching aircraft by a connector 16 and adapted to provide electrical current therefrom to the switch. The arming safety switch itself is positioned within a housing 18 and the electrical cable 14 is received therein by a sleeve member 19 having associated therewith an O-ring 20 for sealing the housing from any outside moisture. The electrical cable 14 is electrically connected to an annular member 22 having upstanding spring-like portions 21 near the center thereof and composed of a material such as beryllium-copper, initially being suitably heat-treated.

A stabber member 25 comprises the external movable switch contact, which is provided with a shrink tube 26 about the stabber portion for insulation purposes to be hereafter described, and is hollowed out for receiving within the annular groove 27 formed therein an elastic-like clamping member 28 formed of nylon or polyethylene for preventing shorting, and a coil spring 29 compressed against a back plate insulating member 30 for urging the stabber member 25 toward contact 12 in the bomb fuze. An axial bore is provided within stabber member 25, clamp member 28, back plate 30 and housing 18 for receiving a plunger housing 33. A plunger 34 is slideably received within the housing 33, and when positioned as shown, the plunger 34 closes a plurality of apertures provided in the housing 33 and thereby locks housing 33 to the stabber member 25 by means of a set of ball members 36 positioned within the apertures therein and within circular groove 35 in stabber member 25 just off the axial bore therein. The plunger housing 33 is provided with an O-ring 40 serving as a weathertight seal between housing 33 and the plunger 34, and a shear pin 41 is inserted through aligned apertures in the housing 33 and plunger 34, externally of the housing 18, to secure the plunger 34 therein.

The total shield foil 43, which is composed of an easily rupturable material such as hardened beryllium-copper, is forwardly positioned within the device against a metallic plate member 45 composed of brass or copper, which is crimped about a thick plastic member 44 and ground ring member 46. A plastic block 47 serves as a spacer between annular member 22 and back plate member 30 within housing 18, and a pair of plastic annular members 48 serve as spacers and insulators between the total shield foil 43 and the forward side of the annular member 22.

A cable 50 is looped through an aperture in the plunger 34 and fastened within an insulating shrink tube to serve as a lanyard connection to the aircraft through a connector member 51 secured thereto.

In operation, radiation hazard is kept from the fuze by the shield 43 metallic plate 45 and ground ring 46, separated switch contacts 12 and 25. On release of the weapon from the aircraft, lanyard 50 causes severing of shear pin 41, and subsequently removes the plunger 34 from the housing 33. When plunger 34 is withdrawn in this manner, the balls 36 are permitted to drop from engagement with the groove 35 and to pass through the apertures in the plunger housing 33 into the axial bore therein. Upon release of this ball lock mechanism, coil spring 29 drives the stabber member 25 forward, causing the stabber portion thereof to pierce the total shield foil 43. The force of the spring 29 is sufficient to compress the upstanding spring-like portions 21 of the contact member 22 when stabber member 25 strikes against it, and additional contact bounce between stabber 25 and contact 12 is prevented by a copper disc, not shown, provided on the fuze side of the total shield foil. The shrink tube 26 then insulates the stabber contact from the total shield foil 43.

The connection between the cable 14, annular contact plate member 22, the stabber member 25 and contact 12 provides continuity between the aircraft and the bomb fuze for charging the electric bomb fuze as the bomb drops away from the aircraft. For the purpose of minimizing aircraft damage, the electrical cable connection to the aircraft is permitted to go down with the bomb instead of staying with the aircraft. This is accomplished by release of the cable 14 and connector 16 when a sufficient predetermined amount of cable has payed out therefrom.

It is readily apparent that radiation hazard protective parts, strength member parts and anti-shorting parts are provided by the present invention to prevent undesirable electromagnetic radiation of all frequencies from entering the bomb fuze. The invention therefore fills a very definite need in providing a suitably shielded electrically-armed fuze for a bomb which is safe against accidental ignition or ignition at an undesirable time by electrostatic or electromagnetic energy.

Obviously many modifications and variations of the present invention are possible in the light of the above teachings. It is therefore to be understood that within the scope of the appended claim the invention may be practiced otherwise than as specifically described.

What is claimed is:

An electromagnetic radiation proof bomb-arming device comprising:
- a fixed contact positioned within the fuze-charging assembly of a bomb,
- a housing secured to the fuze-charging assembly,
- a movable contact comprising a spring-loaded piston slideably mounted within said housing and having a stabber portion at one end thereof facing towards the fixed contact in the assembly and having an axial bore in the other end thereof,
- a total shield foil positioned within said housing between said fixed and movable contacts for shielding the fixed contact and the fuze from electromagnetic radiation,
- a plunger slideably positioned in said piston within said bore,
- ball-lock means between said piston and said housing and releasably secured in the locked position by said plunger for preventing movement of said movable contact,
- said ball lock means comprising an internal recessed groove within said axial bore of said piston containing a plurality of balls therein, said balls being constrained from radially inward movement by said plunger,
- an annular conductive plate member within said housing between said total shield foil and said movable contact and spaced therefrom,
- an electrical cable connected to said conductive plate member for providing current flow thereto from the aircraft,
- releasable connection means between said cable and said aircraft,
- a lanyard between said plunger and said aircraft,
- and a shear pin linking said plunger to said housing to normally prevent withdrawal of the plunger therefrom and adapted to shear under a predetermined stress,
- whereby when said bomb is released, the shear pin is sheared and the plunger is withdrawn from the housing to unlock the ball-lock between the piston and the housing, thus permitting the piston to be driven forward by the spring until it engages the conductive plate and the stabber thereon penetrates the total shield foil and contacts the fixed contact, thereby providing continuity between the aircraft power supply, the electrical cable, the conductive plate member, the movable contact and the fixed contact to enable charging of the fuze as the bomb continues to fall away from the aircraft.

References Cited by the Examiner

UNITED STATES PATENTS

| | | | |
|---|---|---|---|
| 2,873,648 | 2/1959 | Musser et al. | 89—1 |
| 3,049,932 | 6/1963 | Greenlees | 102—70.2 X |
| 3,101,055 | 8/1963 | Kuntz et al. | 102—70.2 |
| 3,158,060 | 11/1964 | Semenoff et al. | 89—1.5 |

SAMUEL W. ENGLE, *Primary Examiner.*